(12) United States Patent
Adepalli

(10) Patent No.: US 12,275,119 B2
(45) Date of Patent: Apr. 15, 2025

(54) IRON GRADIENT IN POLYCRYSTALLINE DIAMOND COMPACTS; BLANKS, CUTTERS AND CUTTING TOOLS INCLUDING SAME; AND METHODS OF MANUFACTURE

(71) Applicant: DIAMOND INNOVATIONS, INC., Worthington, OH (US)

(72) Inventor: Kiran Adepalli, Westerville, OH (US)

(73) Assignee: DIAMOND INNOVATIONS, INC., Worthington, OH (US)

( * ) Notice: Subject to any disclaimer, the term of this patent is extended or adjusted under 35 U.S.C. 154(b) by 431 days.

(21) Appl. No.: 17/772,060

(22) PCT Filed: Dec. 3, 2020

(86) PCT No.: PCT/US2020/063129
§ 371 (c)(1),
(2) Date: Apr. 26, 2022

(87) PCT Pub. No.: WO2021/118861
PCT Pub. Date: Jun. 17, 2021

(65) Prior Publication Data
US 2022/0371158 A1    Nov. 24, 2022

Related U.S. Application Data

(60) Provisional application No. 62/946,623, filed on Dec. 11, 2019.

(51) Int. Cl.
*B24D 3/10*    (2006.01)
*B01J 23/745*    (2006.01)
(Continued)

(52) U.S. Cl.
CPC .............. *B24D 3/10* (2013.01); *B01J 23/745* (2013.01); *B01J 23/75* (2013.01); *C01B 32/28* (2017.08);
(Continued)

(58) Field of Classification Search
CPC .............. B24D 3/06; B24D 3/10; C01B 32/28
See application file for complete search history.

(56) References Cited

U.S. PATENT DOCUMENTS 6,777,074 B2 *   8/2004   Noda ................... C04B 35/6455
428/472
2013/0015001 A1   1/2013   Bertagnolli

FOREIGN PATENT DOCUMENTS

EP          3183211 A      6/2017
WO      20100117823 A     10/2010

* cited by examiner

*Primary Examiner* — Shuangyi Abu Ali

(57) ABSTRACT

Polycrystalline diamond compacts, polycrystalline diamond blanks, polycrystalline diamond cutters, and tools incorporating same for cutting, milling, grinding, drilling and other abrasive operations, particularly in metal cutting applications, include a diamond table having a gradient in iron content that increases as distance into the volume of the diamond table increases. The iron gradient increases resistance to wear, such as in interrupted milling tests. The disclosure further relates to methods of manufacturing polycrystalline diamond compacts having a gradient in iron concentration in the diamond table, blanks and cutters including polycrystalline diamond compacts, cutting tools incorporating such compacts, blanks and cutters, and methods of cutting, milling, grinding and drilling, particularly metal machining, using such compacts, blanks, cutters, cutting tools and drill bits.

11 Claims, 9 Drawing Sheets

(51) Int. Cl.
*B01J 23/75* (2006.01)
*C01B 32/28* (2017.01)
*C09K 3/14* (2006.01)

(52) U.S. Cl.
CPC ........ *C09K 3/1436* (2013.01); *C01P 2004/61* (2013.01)

IRON GRADIENT IN POLYCRYSTALLINE DIAMOND COMPACTS; BLANKS, CUTTERS AND CUTTING TOOLS INCLUDING SAME; AND METHODS OF MANUFACTURE

This is a National Phase Application filed under 35 U.S.C. 371 as the national stage of PCT/US2020/063129 filed on Dec. 3, 2020, an application claiming the benefit of U.S. Application No. 62/946,623 filed on Dec. 11, 2019, the entire content of each of which is hereby incorporated by reference in its entirety.

FIELD OF THE DISCLOSURE

The present disclosure relates to abrasive structures, in particular polycrystalline diamond compacts, blanks, and cutters and cutting tools including same. More specifically, the present disclosure relates to polycrystalline diamond bodies having a gradient in iron concentration in the diamond body, whereby, e.g., in the case of a polycrystalline blank the amount of iron in the diamond body decreases from an exterior surface into the interior volume towards a substrate. Such diamond bodies with Fe-gradients can be embodied in stand-alone unsupported compacts or be supported by a substrate in a blank or cutter embodiment. Each of compacts, blanks and cutters can be employed as the cutting element on a cutting tool. The disclosure further relates to methods of manufacturing polycrystalline diamond compacts, blanks and cutters having a gradient in iron concentration in the diamond table, cutting tools incorporating such compacts, blanks and cutters, and methods of cutting, milling, grinding and drilling, particularly metal machining or rock drilling, using such compacts, blanks, cutters and cutting tools.

BACKGROUND

In the discussion that follows, reference is made to certain structures and/or methods. However, the following references should not be construed as an admission that these structures and/or methods constitute prior art. Applicant expressly reserves the right to demonstrate that such structures and/or methods do not qualify as prior art against the present invention.

Abrasive compacts consist of a mass of diamond or cubic boron nitride particles bonded into a coherent, polycrystalline hard conglomerate. Abrasive compacts, particularly based on polycrystalline diamond (PCD) particles, come in various shapes and sizes, but typically are cylindrical and include a volume of abrasive particles attached or joined coherently to a substrate.

One application of abrasive compacts, particularly of abrasive compacts based on polycrystalline diamond, is in cutting tools, such as for metal machining application or for use in geological formation drilling applications. Compacts attached to a substrate, either integrally formed during manufacture of the coherent, polycrystalline hard conglomerate or mounted together subsequently, form blanks and cutters. Compacts, blanks and cutters can be mounted on tools, for example, by brazing or by forming integrally, such as in casting. Often in cutting, milling, grinding, and drilling applications, large forces act on the point or cutting edge of the working surface of the volume of abrasive particles. As a result, cracks develop in or behind the cutting edge or point of contact and these cracks can propagate into and through the coherent, polycrystalline hard conglomerate. In addition, heat generated by the various abrasive operations can negatively impact the coherent, polycrystalline hard conglomerate, particularly of diamond particles—first, by causing back-conversion of diamond to carbon, which reduces strength of the abrasive compact, and second, by causing thermal expansion, which results in cracking of the abrasive compact due to differences in the coefficient of thermal expansion of the various materials in the abrasive compact, particular between the diamond material and any catalyst material within the coherent, polycrystalline hard conglomerate portion. Additionally, abrasive compacts experience impact damage, resulting in large cracks that propagate through the coherent, polycrystalline hard conglomerate, which can lead to large losses of the material, i.e., by spalling or chipping.

Thus, it would be advantageous to have a coherent, polycrystalline hard conglomerate, particularly a polycrystalline diamond compact, blank or cutter, having a composition and features that had, one or more of, a reduced back-conversion at elevated temperatures, a reduced difference in coefficient of thermal expansion to reduce thermal expansion cracking, and an increased toughness to minimize impact damage.

SUMMARY

The present disclosure is directed to polycrystalline diamond compacts, polycrystalline diamond blanks, polycrystalline diamond cutters, and tools incorporating same for cutting, milling, grinding, drilling and other abrasive operations, particularly in metal machining applications or for use in geological formation drilling applications, where the diamond table has a gradient in iron content that increases as distance into the volume of the diamond table increases, which imparts improved mechanical properties to the diamond table. Additional features and advantages will be set forth in the description that follows, and in part will be apparent from the description, or may be learned by practice of the invention. The objectives and other advantages of the disclosure will be realized and attained by the structures, particularly pointed out in the written description and claims thereof, as well as the appended drawings.

The present disclosure includes embodiments of a polycrystalline diamond compact comprising a volume of crystalline diamond grains bonded together by diamond-to-diamond bonds to form a diamond body. The diamond body includes a plurality of inter-grain regions disposed between the bonded crystalline diamond grains, a cobalt-based catalyst material present in at least a portion of the plurality of inter-grain regions, and, e.g., in the case of a polycrystalline diamond blank, an iron concentration gradient extends from an exterior surface of the diamond body into an interior volume of the diamond body towards the interface, i.e., the amount of iron in the diamond body decreases from an exterior surface into the interior volume towards the interface.

The present disclosure also includes embodiments of a polycrystalline diamond blank or cutter comprising a volume of crystalline diamond grains bonded together by diamond-to-diamond bonds to form a diamond body and a hard metal substrate. The diamond body includes a plurality of inter-grain regions disposed between the bonded crystalline diamond grains and a cobalt-based catalyst material present in at least a portion of the plurality of inter-grain regions, and the diamond body is bonded to the hard metal substrate to form an interface. An iron concentration gradient in the diamond body extends from the interface into an interior volume of the diamond body. In such a case, the concentration of iron is lower at the interface and increases towards the exterior surface.

In another aspect, embodiments of cutting tools, such as a drill bit and a drag bit, are disclosed. In drill bits, a metal alloy body (including a front end, a shaft portion, and a rear end adapted to be mounted in a tool holder) has a polycrystalline diamond compact or blank attached to the front end. In drag bits, a plurality of such polycrystalline diamond compacts and/or a plurality of such polycrystalline diamond cutters are arranged on and affixed to a radially outward periphery of a plurality of fins, which are arranged along an exterior surface of the front end of the drag bit body with each fin separated from a sequentially adjacent fin by a rearwardly extending, helically-shaped flute.

In another aspect, an embodiment of a cutting tool comprises a first substrate and a tip affixed to a seating surface of the first substrate. The tip includes a volume of crystalline diamond grains bonded together by diamond-to-diamond bonds to form a diamond body, the diamond body including a plurality of inter-grain regions disposed between the bonded crystalline diamond grains, a cobalt-based catalyst material present in at least a portion of the plurality of inter-grain regions, a second substrate, wherein the second substrate is formed of a hard metal and wherein the diamond body is bonded to the second substrate to form an interface, and an iron concentration gradient in the diamond body extending from the interface into an interior volume of the diamond body. Here again, the iron concentration at the exterior surface is greater than that towards the interior volume and lowest proximate the interface. In exemplary embodiments, the tip is affixed to the first substrate by brazing the tip to the seating surface of the first substrate.

In another aspect, there is provided an embodiment of a method of manufacturing a polycrystalline diamond compact comprising an assembly, wherein the assembly comprises a diamond catalyst source, a layer of diamond feed in contact with the diamond catalyst source, and a refractory container. The refractory container contains the diamond catalyst source and the layer of diamond feed and the method processes the assembly at elevated temperature and elevated pressure sufficient to sinter the diamond feed into a diamond body. The diamond feed includes 90 to 99 wt. % diamond particles and 1 to 10 wt. % of a cobalt-iron alloy resulting in a diamond body that includes a volume of crystalline diamond grains bond together by diamond-to-diamond bonds, a plurality of inter-grain regions disposed between the bonded crystalline diamond grains, a cobalt-based catalyst material present in at least a portion of the plurality of inter-grain regions, and an iron concentration gradient extending from an exterior surface of the diamond body into an interior volume of the diamond body.

In another aspect, there is provided an embodiment of a method of manufacturing a polycrystalline diamond blank or cutter comprising forming an assembly, wherein the assembly comprises a hard metal substrate having a composition including cemented carbide or cobalt sintered tungsten carbide (WC—Co), a layer of diamond feed in contact with the diamond catalyst source, and a refractory container. The refractory container contains the diamond catalyst source and the layer of diamond feed and the method processes the assembly at elevated temperature and elevated pressure sufficient to sinter the diamond feed into a diamond body. The hard metal substrate is iron-free and has a composition including cemented carbide or cobalt sintered tungsten carbide (WC—Co). The diamond feed includes 90 to 99 wt. % diamond particles, where an average diameter of the diamond particles is equal to or greater than 0.5 micron and equal to or less than 40 microns. The diamond feed also includes 1 to 10 wt. % of a cobalt-iron alloy, where the cobalt-iron alloy is $Co_xFe_y$, where $0.6 \leq x \leq 0.8$, $0.2 \leq y \leq 0.4$, and $x+y=1.0$. HPHT processing the diamond feed results in a diamond body that includes a volume of crystalline diamond grains bond together by diamond-to-diamond bonds, a plurality of inter-grain regions disposed between the bonded crystalline diamond grains, a cobalt-based catalyst material present in at least a portion of the plurality of inter-grain regions, and an iron concentration gradient extending from an exterior surface of the diamond body into an interior volume of the diamond body.

In exemplary embodiments, the diamond feed consists of 90 to 99 wt. % diamond particles and a balance to 100 wt. % of cobalt-iron alloy.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with the embodiments of the disclosure. It is to be understood that both the foregoing general description and the following detailed description of the present disclosure are examples and explanatory, and are intended to provide further explanation of the disclosure as claimed.

BRIEF DESCRIPTION OF THE DRAWING

The accompanying drawings, which are included to provide a further understanding of the invention and are incorporated in and constitute a part of this specification, illustrate implementations of the invention and together with the description serve to explain the principles of the disclosure.

Figure 1:
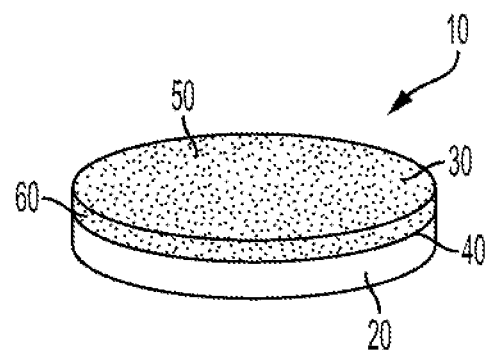
FIG. 1 shows a schematic perspective view of a cylindrically-shaped abrasive blank based on polycrystalline diamond (PCD) particles.

Throughout the drawings and the detailed description, unless otherwise described, the same drawing reference numerals should be understood to refer to the same elements, features, and structures. The relative size and depiction of these elements may be exaggerated for clarity, illustration, and convenience. Also, for ease of viewing, in some instances only some of the named features in the figures are labeled with reference numerals.

DETAILED DESCRIPTION

FIG. 1 shows a schematic perspective view of a cylindrically-shaped abrasive blank 10 based on polycrystalline diamond (PCD) particles. The abrasive blank is also referred to as a polycrystalline diamond blank (PDC). The blank 10 has a substrate 20, which is made of hard metal, alloy, or composite, and most typically of cemented carbide or cobalt sintered tungsten carbide (WC—Co); and a polycrystalline diamond composite volume 30 (also called a diamond table or a diamond body) attached or joined coherently to the substrate along an interface 40. In the polycrystalline diamond composite volume 30, the diamond particle content is high and there is an extensive amount of diamond-to-diamond bonding, i.e., direct particle-to-particle bonding among the diamond particles. Often, a catalyst, such as cobalt metal or its alloys, is present as a diamond bond-forming aid in high pressure and high temperature (HPHT) manufacturing of the polycrystalline diamond cutter 10. The polycrystalline diamond blank 10 may be later machined to a desired shape, including machining to specified outer diameter, height and (optionally) the addition of any surface features such as chamfers or beveled surfaces. Chamfers or beveled surfaces are more typically found on polycrystalline diamond cutters as opposed to polycrystalline diamond blanks. All or portions of the top surface 50 and side surface 60 can be the working surface of the polycrystalline diamond blank 10, i.e. a surface of the polycrystalline diamond blank 10 that contacts a workpiece during cutting, milling, grinding or drilling.

The polycrystalline diamond composite volume 30 is frequently supported by being bonded to a substrate or support, for example, a substrate of hard metal such as cemented carbide, in which case the integrally formed structure of polycrystalline diamond composite volume 30 and substrate is referred to herein as a polycrystalline diamond blank or a blank (for metal machining applications) or as a polycrystalline diamond cutter or a cutter (for geological formation drilling applications). However, it should be noted that in some instances, the polycrystalline diamond composite volume 30 can be unsupported, i.e., without a substrate, in which case the polycrystalline diamond composite volume 30 is referred to herein as a polycrystalline diamond compact or a compact.

Figure 2:
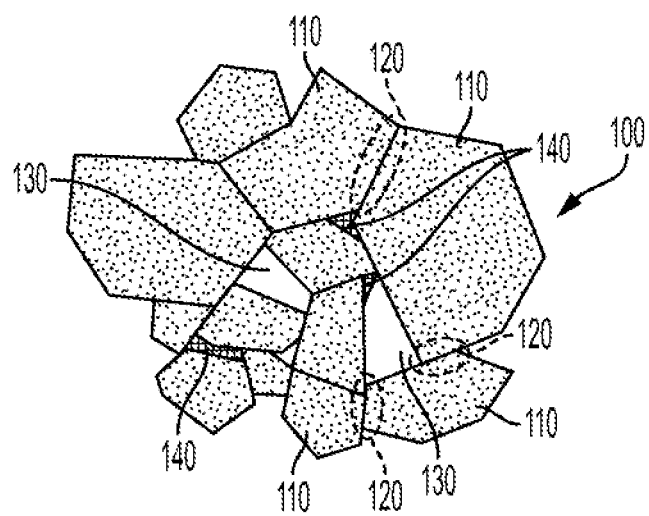
FIG. 2 is a schematic representation of a magnified portion of a diamond body with crystalline diamond grains bonded together by diamond-to-diamond bonds, a plurality of inter-grain regions disposed between the bonded crystalline diamond grains, and cobalt-based catalyst material present in at least a portion of the plurality of inter-grain regions.

Both in embodiments as a polycrystalline diamond blank or polycrystalline diamond cutter and in embodiments as a polycrystalline diamond compact, the diamond body is formed from a volume of crystalline diamond grains bonded together by diamond-to-diamond bonds. FIG. 2 is a schematic representation of a magnified portion of a diamond body 100. In the diamond body, crystalline diamond grains 110 are bonded together by diamond-to-diamond bonds 120. The diamond body 100 includes a plurality of inter-grain regions 130 disposed between the bonded crystalline diamond grains 110. A cobalt-based catalyst material 140 is present in at least a portion of the plurality of inter-grain regions 130 and/or in a portion of an individual inter-grain region 130. As disclosed herein, optional processing can remove metal catalyst from inter-grain regions, and such inter-grain regions without metal catalyst are also shown in FIG. 2.

In addition, the diamond body of the compact, blank or cutter has an iron concentration gradient extending from an exterior surface of the diamond body into an interior volume of the diamond body. When mounted on a substrate, such iron concentration gradient extends from an interface between the diamond body and the substrate. In general, the iron concentration gradient varies from 0-0.1 wt. % Fe at an exterior surface of a compact or, in the case of a blank, at the interface, and 0.7-1 wt. % Fe at a location in the diamond body at a distance of approximately 600-700 microns from the exterior surface/interface. In some embodiments, the iron concentration gradient varies from 0 wt. % Fe, alternatively 0.01 to 0.1 wt. % Fe, at the exterior surface of the diamond body (for a polycrystalline diamond compact) or from the interface (for polycrystalline diamond blank or cutter) to 0.7 to 0.9 wt. % Fe at a distance of 600 to 700 microns from the exterior surface/interface. In other embodiments, the iron concentration gradient varies from 0 wt. % Fe, alternatively 0.01 to 0.1 wt. % Fe, at the exterior surface of the diamond body (for a polycrystalline diamond compact) or from the interface (for polycrystalline diamond blank or cutter) to 0.3 to 0.4 wt. % at a distance of 600 to 700 microns from the exterior surface/interface.

Figure 3A:
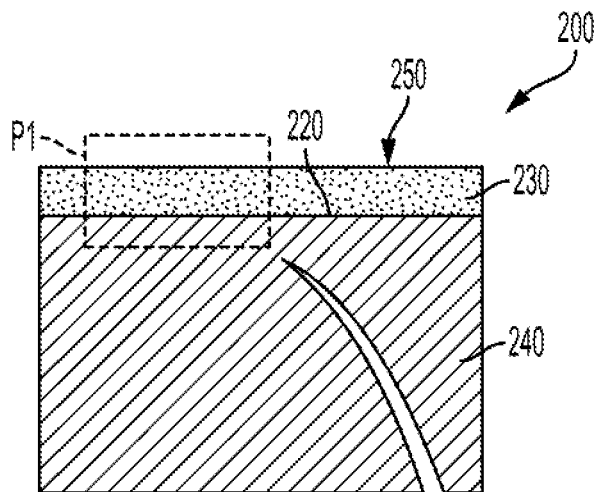
FIG. 3A schematically depicts a cross-section of a polycrystalline diamond blank with a magnified portion P1 and FIG. 3B schematically depicts the iron gradient across the diamond table in portion P1.
Figure 3B:
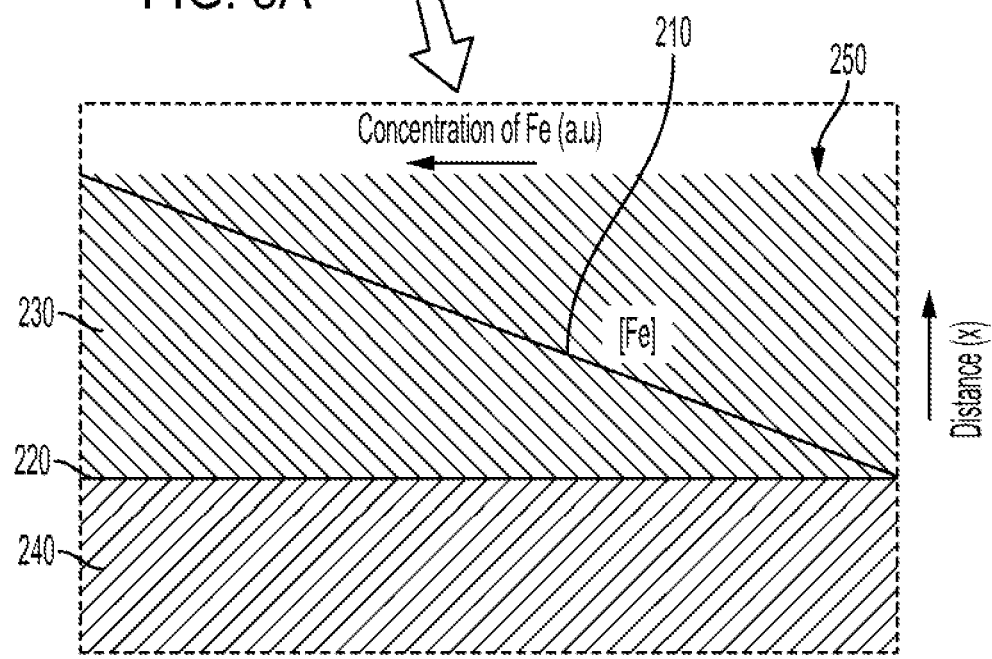

FIG. 3A schematically depicts a cross-section of a blank 200 with a magnified portion P1 and FIG. 3B schematically depicts the iron gradient across the diamond table in portion P1. As seen in FIG. 3B, the overall iron concentration 210 increases with distance from the interface 220 between the diamond table 230 and the substrate 240 (such as a cemented WC substrate) to the top surface 250 of the diamond table 230. In the schematic in FIG. 3B, the iron concentration ([Fe]) is in arbitrary unit (a.u.).

Figure 4:
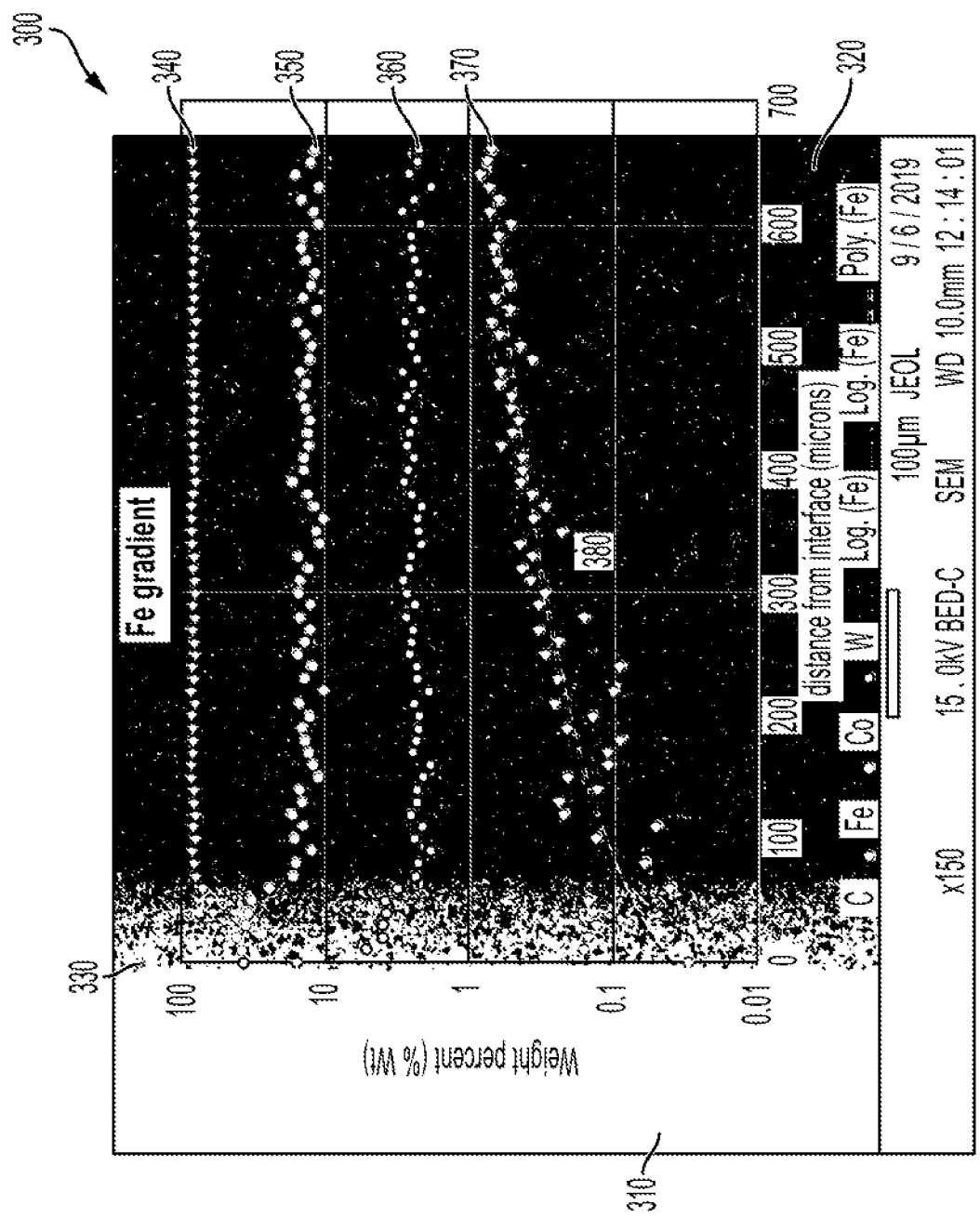
FIG. 4 is a scanning electron microscope (SEM) photomicrograph of a cross-section of a portion a polycrystalline diamond blank showing a portion of the substrate and a portion of the diamond table and, superimposed on the photomicrograph, are results from energy-dispersive X-ray spectroscopy (EDS) from an line scan across the diamond table.

FIG. 4 is a scanning electron microscope (SEM) photomicrograph 300 of a cross-section of a portion of a blank consistent with those disclosed herein. The photomicrograph 300 shows a portion of the substrate 310 and a portion of the diamond table 320. The substrate is tungsten carbide. The photomicrograph 300 is at 150× magnification and the scale bar in the lower margin is 100 microns.

Superimposed on the photomicrograph 300 in FIG. 4 are results from energy-dispersive X-ray spectroscopy (EDS). The results are from an EDS line scan across the diamond table 320 starting from the substrate/diamond table interface 330 and extending toward the surface of the diamond table 320, typically toward a portion of the working surface, alternatively toward the top surface 60. The EDS results graphically present elemental content in the diamond table 320 as weight percent (wt. %) as a function of distance from the interface (microns). The weight percent (wt. %) is on a logarithmic scale and ranges from 0.0 wt. % to 100 wt. % and the distance from the interface 330 ranges from 0 to greater than 600 microns. The far right side of the image is at a distance of 680 microns. The elemental content shown in the EDS results are carbon (C) 340, cobalt (Co) 350, tungsten (W) 360, and iron (Fe) 370. Also shown is a curve fit 380 for the iron content 370. Because weight percent (wt. %) is on a logarithmic scale the curve fit 380 for the iron content 370 represents a gradient in iron content (Fe wt. %) that linearly increases as a function of distance from the interface 330. The experimentally determined linear gradient in iron content shown in FIG. 4 is consistent with the schematically represented iron concentration ([Fe]) 210 in FIG. 3B.

In the photomicrograph 300 in FIG. 4, the carbon 340 content is from the diamond in the diamond table 320 and is substantially constant at distances greater than 100 microns at an amount greater than 90 wt. % after increasing from approximately 60 wt. % at or near the interface 330. The cobalt 350 and tungsten 360 content in the diamond table 320 is swept into the diamond table 320 from the substrate 310 during the HPHT processing and each is at its maximum at the interface 330 before becoming substantially constant at distances greater than 100 microns at an amount of approximately 13 wt. % for cobalt 350 and an amount of approximately 2.5 wt. % for tungsten 360. The substrate in this sample was iron-free and the iron 370 content is from iron present in the diamond feed used in the HPHT processing. The iron content is also influenced by the sweep of cobalt into the diamond table in that the iron is at least partially swept with the sweep of the cobalt. Therefore, the iron content is lower at the interlace 330 than in an interior portion of the diamond table 320. In FIG. 4, the iron 370 content varies from approximately 0.0 wt. %, alternatively 0.01 to 0.1 wt. % Fe, at the interface to approximately 0.8 wt. % at a distance from the interface of 680 microns.

Figures 5A, 5B:
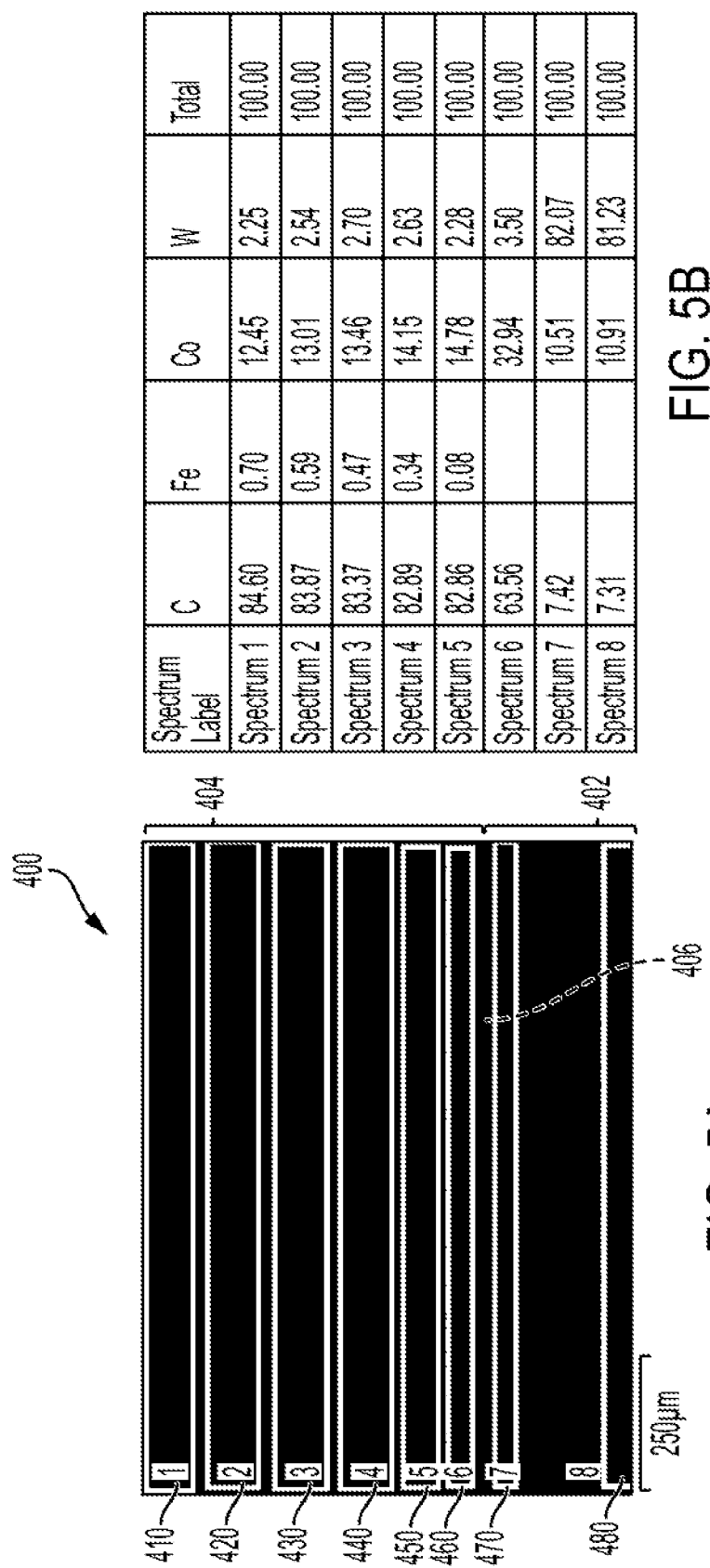
FIG. 5A is a second SEM photomicrograph of a cross-section of a portion a polycrystalline diamond blank, regions or which were area mapped for compositional analysis by EDS area scan
FIG. 5B is a table showing the results from that compositional analysis.

FIG. 5A is a second (SEM) photomicrograph 400 of a cross-section of a portion of a blank consistent with those disclosed herein. The photomicrograph 400 is at 150× magnification and the scale bar in the lower margin is 250 microns. Eight regions are indicated on the photomicrograph 400 and correspond to regions that were sampled by area mapping for compositional analysis by EDS area scan. FIG. 5B is a table showing the results from compositional analysis on the eight regions. The numbering of the "spectrum" in the table in FIG. 5B corresponds to the numbering of the regions in FIG. 5A and some details on the location of each region (whether in the substrate 402 or diamond table 404 and distance relative to the interface 406 (which has been annotated with a dashed line) in FIG. 5A) is shown in the following Table 1.

TABLE 1

Information related to FIGS. 5A and 5B

| Reference Numeral in FIG. 5A | Region in FIG. 5A | Location of Region in FIG. 5A | Spectrum in FIG. 5B |
|---|---|---|---|
| 410 | 1 | diamond table; about 537 to 630 microns from interface | Spectrum 1 |
| 420 | 2 | diamond table; about 413 to 518 microns from interface | Spectrum 2 |
| 430 | 3 | diamond table; about 290 to 386 microns from interface | Spectrum 3 |
| 440 | 4 | diamond table; about 166 to 270 microns from interface | Spectrum 4 |
| 450 | 5 | diamond table; about 79 to 150 microns from interface | Spectrum 5 |
| 460 | 6 | diamond table; about 23 to 65 microns from interface | Spectrum 6 |
| 470 | 7 | substrate; about 26 to 65 microns from interface | Spectrum 7 |
| 480 | 8 | substrate; about 222-276 microns from interface | Spectrum 8 |

From the results in FIG. 5B, one observes that the substrate 402 has a composition of, cobalt, tungsten and carbon, which is consistent with a substrate of cobalt tungsten carbide (Co—WC). Furthermore, as seen from Spectrums 7 and 8, which are both in the interior of the substrate 402, the composition of the substrate 402 is iron-free. Also from the results in FIG. 5B, one observes that the amount of iron in the diamond table 404 varies from 0.08 wt. % (see Spectrum 5 corresponding to Region 5) to 0.70 wt. % (see Spectrum 1 corresponding to Region 1). This change in amount of iron in the diamond table occurred over approximately 630 microns, for an average rate of change of iron as a function of distance from the interface of approximately 0.001 wt. % per micron.

Figure 6:
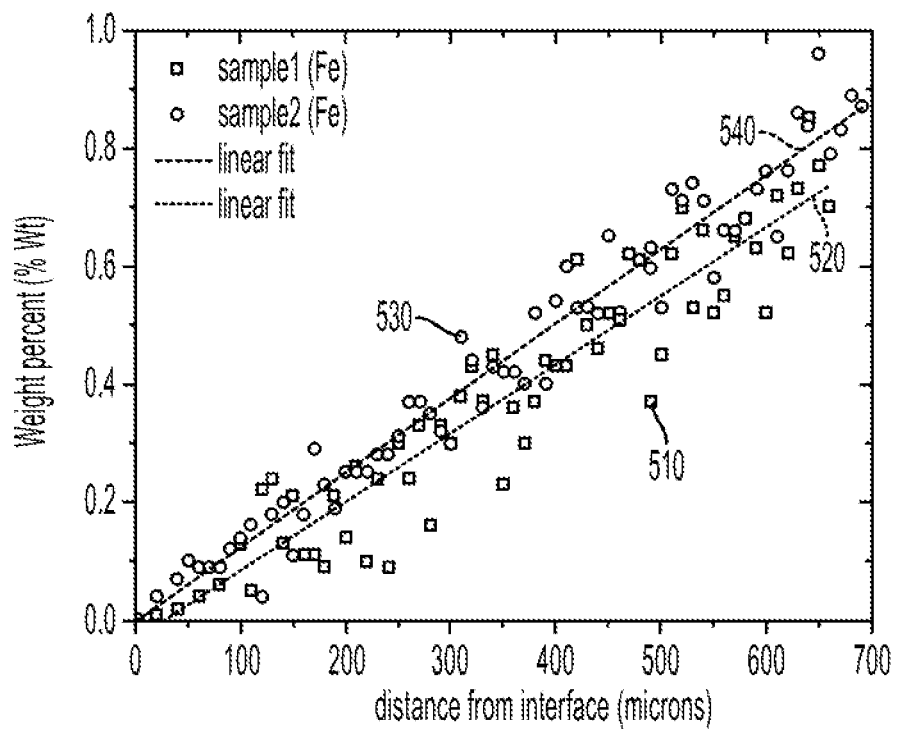
FIGS. 6 and 7 are graphs of elemental Fe content in the diamond table (in weight percent (wt. %)) as a function of distance from the interface (in microns) for three samples of a polycrystalline diamond cutter.
Figure 7:
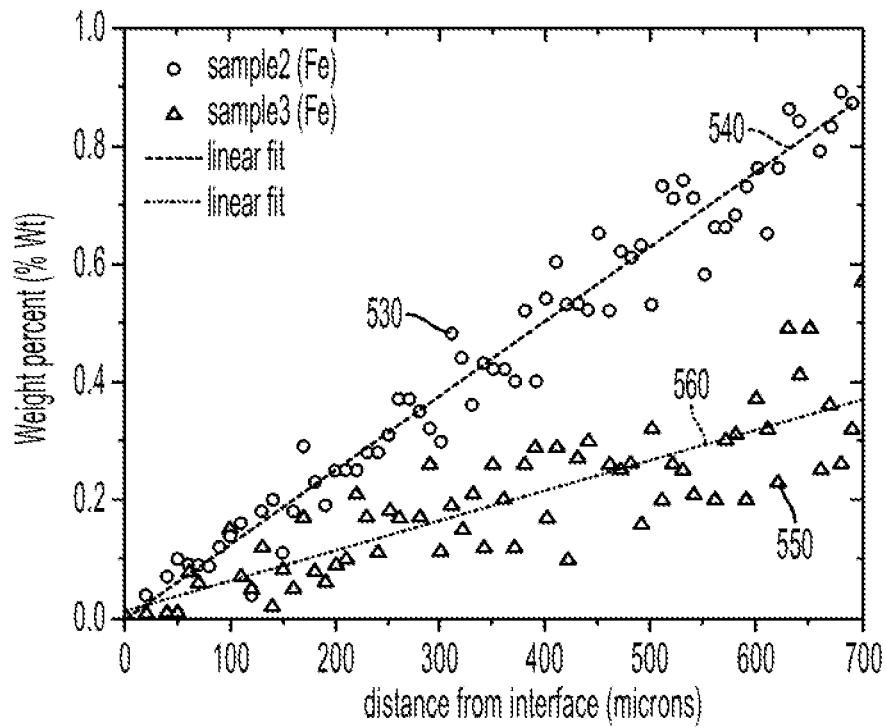

As noted herein, the iron concentration gradient, i.e., the profile or change in amount of iron in the diamond table, varies linearly from the exterior surface of the diamond body (for a polycrystalline diamond compact) or from the interface (for polycrystalline diamond blank or a polycrystalline diamond cutter) into the interior volume of the diamond body. It has further been determined that the slope of the iron concentration gradient varies as the average grain size of the crystalline diamond grains in the diamond feed varies. FIGS. 6 and 7 are graphs of elemental Fe content in the diamond table (in weight percent (wt. %)) as a function of distance from the interface (in microns) for three samples (Sample 1, Sample 2, and Sample 3) of a polycrystalline diamond blank.

In FIG. 6, Sample 1 (squares; indicated at 510 with linear curve fit 520) and Sample 2 (circles; indicated at 530 with linear curve fit 540) both used a diamond feed with crystalline diamond grains having an average grain size of 0.5-3 microns. In FIG. 7, Sample 2 (circles; indicated at 530 with linear curve fit 540) from FIG. 6 is represented and new Sample 3 (triangles; indicated at 550 with linear curve fit 560) is presented. Sample 3 used a diamond feed with crystalline diamond grains having an average grain size of 30 microns. Thus, the average grain size for Sample 3 differed by a factor of 10× as compared to Sample 1 and Sample 2.

Based on the curve fit 520, the elemental Fe content in the diamond table for Sample 1 varied from about 0 wt. % (at the interface) to about 0.74 wt. % at a distance from the interface of 660 microns. Based on the curve fit 540, the elemental Fe content in the diamond table for Sample 2 varied from 0 wt. % (at the interface) to 0.87 wt. % at a distance from the interface of 700 microns. Based on the curve fit 560, the elemental Fe content in the diamond table for Sample 3 varied from about 0 wt. % (at the interface) to about 0.37 wt. % at a distance from the interface of 700 microns.

For each of Sample 1, Sample 2, and Sample 3, the iron composition monotonously increased from the interface (at approximately zero wt. %) into the volume of the diamond table. Furthermore, when all parameters including grain size are the same, the iron concentration gradient are the same (compare Sample 1 to Sample 2), indicating that the iron concentration gradient is reproducible. However, when all parameters are the same and only the average grain size differs between samples, the iron concentration gradient differs (compare Sample 3 to Sample 1 and Sample 2). In the samples shown in FIG. 7, increasing the average grain size by ten-times resulted in reducing the slope of the iron concentration gradient to less than half (as compared to the slope for samples with the smaller grain size).

Although FIGS. 6 and 7 report results from samples manufactured using a diamond feed with crystalline diamond grains having an average grain size of 3 microns or 30 microns, other embodiments of polycrystalline diamond compacts, polycrystalline diamond blanks and polycrystalline diamond cutters can be manufactured using a diamond feed with crystalline diamond grains having other average grain sizes. For example, crystalline diamond grains can have an average grain size of 1 to 40 microns, alternatively 3 to 40 microns, alternatively 25 to 30 microns, alternatively 1 to 25 microns, alternatively 3 to 25 microns, alternatively 1.5 to 3.0 microns. As demonstrated by FIGS. 6 and 7, selection of the average grain size can affect the iron concentration gradient in the as-manufactured product, and the average grain size can be selected to achieve a desired iron concentration gradient.

It is contemplated that varying other parameters would also vary the iron concentration gradient. Examples of other parameters that can be varied to effect the iron concentration gradient and direction include HPHT (high pressure and high temperature) settings, particle size distribution (PSD), total metal content in carbide substrate, total metal content in the diamond table and sweep direction, i.e., metal sweeping vertically from carbide interface in to PCD, horizontally from refractory cup walls that is holding PCD or vertically from the from cup ends via an external metal sweep source.

Polycrystalline diamond compacts and blanks are used extensively in cutting, milling, grinding, drilling and other abrasive operations and metal cutting applications, and polycrystalline diamond compacts and cutters are used extensively in geological formation drilling applications.

Figure 8:
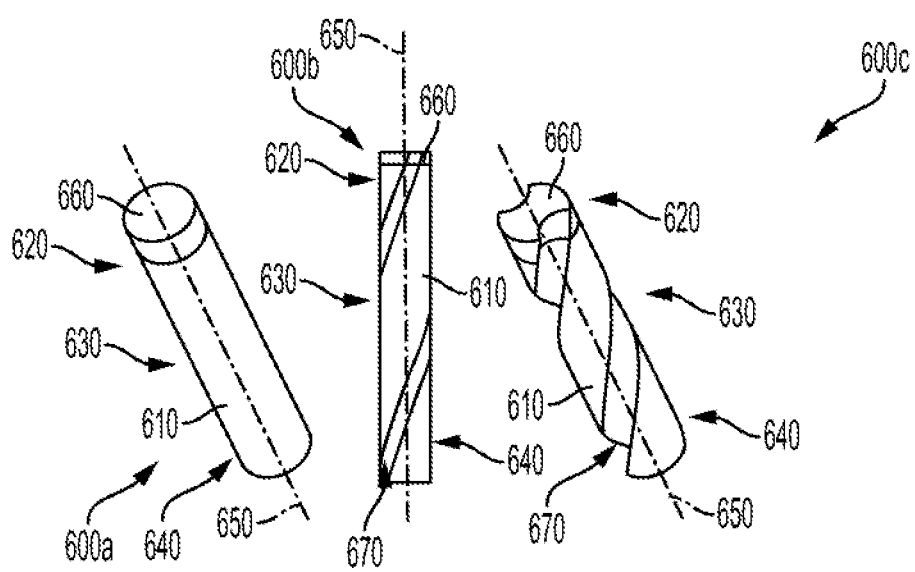
FIG. 8 shows examples of a cutting tool used in the metal machining industry, in this case a drill bit, on which inventive polycrystalline diamond compacts have been mounted.

For example, tools used in the metal machining industry, such as drill bits, can incorporate polycrystalline diamond compacts or polycrystalline diamond blanks. Shown in FIG. 8 are three example drill bits—a perspective view of a solid shaft, round tool 600a, a side view of a helically fluted drill bit 600b, and a perspective view of a helically fluted drill bit 600c. Each of the drill bits include a metal alloy body 610 made from, for example, tungsten carbide. The metal alloy body 610 includes a front end 620, a shaft portion 630, and a rear end 640 adapted to be mounted in a tool holder. The front end 620, the shaft portion 630, and the rear end 640 are arranged sequentially along a longitudinal axis 650 of the body. The drill bits include a polycrystalline diamond compact 660 attached to the front end 620. The polycrystalline diamond compact 660 can be attached by brazing or some other attachment technique, or can be integrally formed with the metal alloy body 610. Helical flutes 670 can optionally be present, as seen by the example round tools 600b and 600c. These example round tools are used, for example, in the aerospace industry for the machining of workpieces of aluminum, titanium, and alloys thereof and of workpieces of composite materials.

Figure 9:
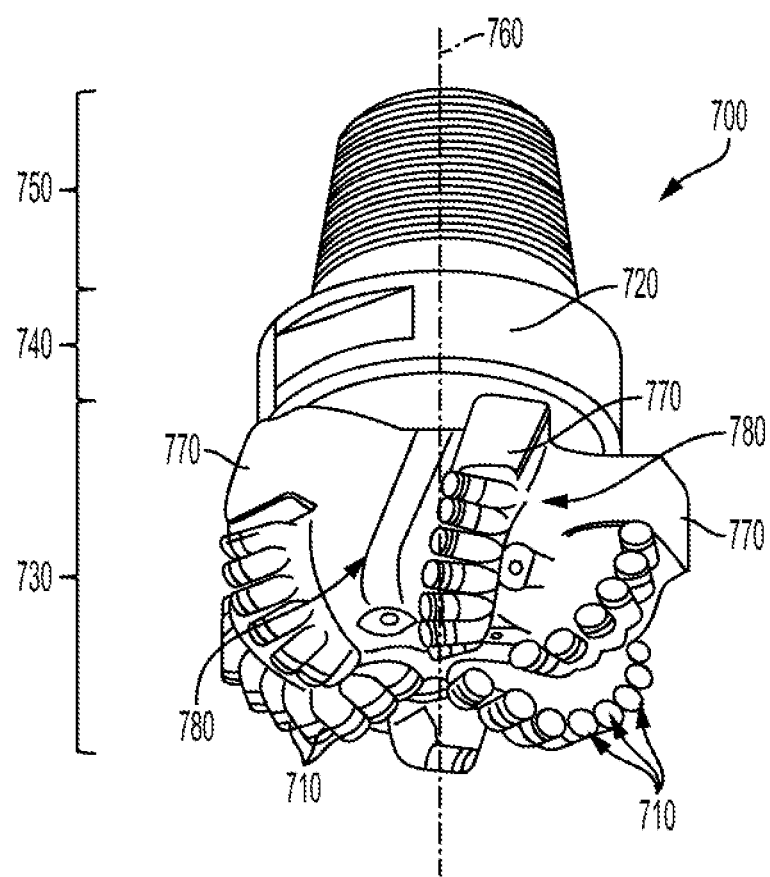
FIG. 9 shows an example of a cutting tool used in the drilling industry, in this case a drag bit, on which inventive polycrystalline diamond cutters have been mounted.

Also, for example, tools used in the drilling industry, such as drag bits 700 (see FIG. 9), often incorporate multiple polycrystalline diamond cutters or polycrystalline diamond compacts. In exemplary embodiments, the drag bit 700 has a metal alloy body 720 including a front end 730, a shoulder region 740 and a threaded rear end 750 arranged sequentially along a longitudinal axis 760 of the body 720. The drag bit 700 has a plurality of fins 770 (also sometimes called blades) arranged along an exterior surface of the front end 730. Each of the fins 770 is separated from a sequentially adjacent fin 770 by a rearwardly extending, helically-shaped flute 780. Additionally, arranged along a periphery region of the fins 770 are a plurality of polycrystalline diamond cutters 710. Although not shown in FIG. 9, the polycrystalline diamond cutters 710 can be replaced by polycrystalline diamond compacts. In each instance, whether polycrystalline diamond cutters or polycrystalline diamond compacts, the diamond table has the features and characteristics described herein including, for polycrystalline diamond cutters, an iron concentration gradient in the diamond body extending from the interface into an interior volume of the diamond body and, for polycrystalline diamond compacts, an iron concentration gradient extending from an exterior surface of the diamond body into an interior volume of the diamond body.

An interrupted milling test was conducted using a face milling machine and a workpiece of Al-6 at. % Si alloy. Samples of polycrystalline diamond blanks having features and characteristics described herein including an iron concentration gradient in the diamond body extending from the interface into an interior volume of the diamond body were tested in the interrupted milling test. Samples of polycrystalline diamond blanks without an iron concentration gradient in the diamond body extending from the interface into an interior volume of the diamond body were used as a control in the interrupted milling test. Details on the tool testing conditions for the interrupted milling test are in Table 2.

TABLE 2

Details on tool testing conditions for interrupted milling test

| Tool Testing Conditions | Details |
| --- | --- |
| Cutter Nest | NPS1543R (15 deg lead) |
| Insert | SNG 432 |
| Material | A356-T6 (125L × 70W × 150T, mm) |
| Cutting speed | Vc = 1500 m/min => 2400 m/min |
| Feed/rev | fn = 0.2 mm/rev |
| Feed rate | vf = 940 mm/min => 1504 mm/min |
| Depth of cut | ap = 0.3 mm |
| Pass-1 Cut width | ae = 25.54 mm |
| Pass-2 Cut width | ae = 44.46 mm (4 slots) |
| Coolant | Dry |

Figure 10:
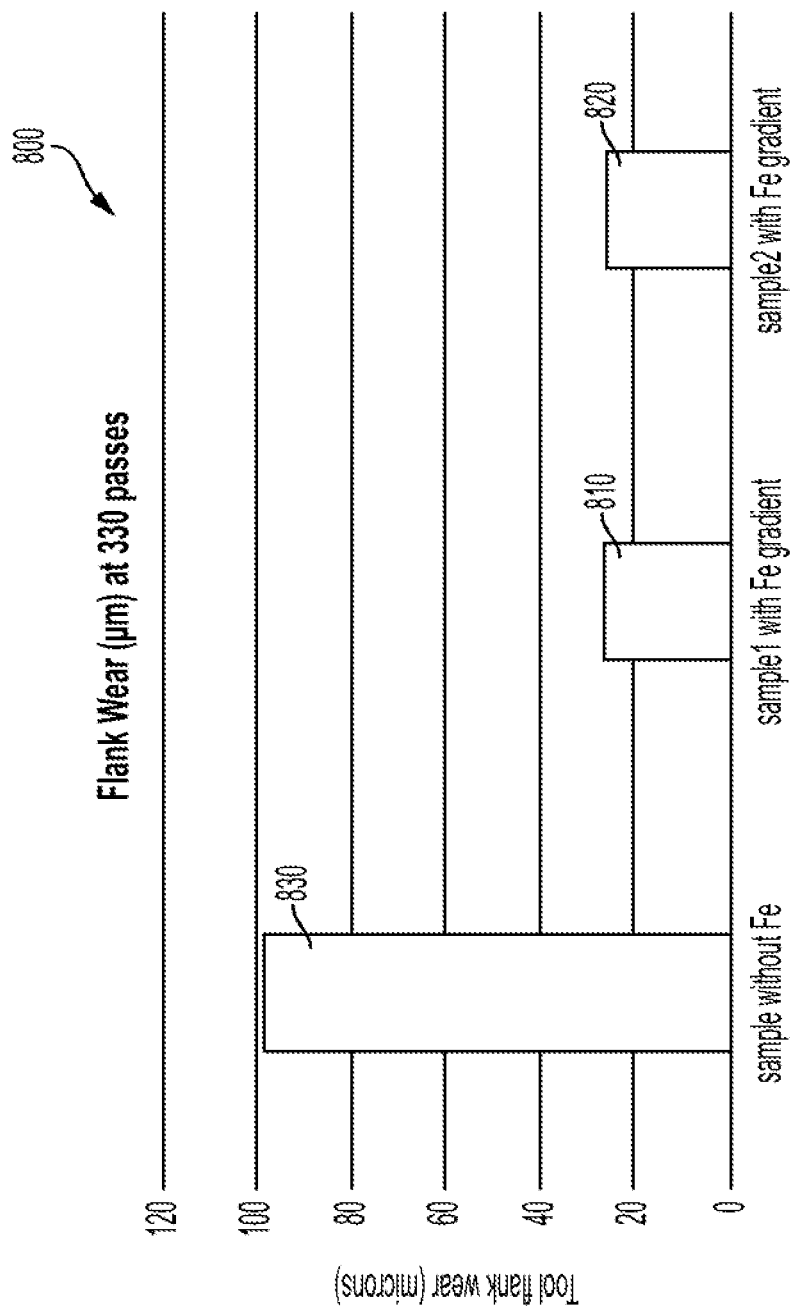
FIG. 10 is a graph showing results from interrupted milling tests on two inventive polycrystalline diamond blanks and one comparative polycrystalline diamond blank.

The interrupted milling test was conducted for 330 passes, after which samples were removed from the milling test and the flank wear measured using an optical microscope. FIG. 10 is a graph 800 showing results from the interrupted milling tests. In FIG. 10, the Y-axis shows tool wear for (a) two inventive polycrystalline diamond tools 810, 820 with an iron concentration gradient in the diamond body extending from the interface into an interior volume of the diamond body and (b) a comparative example polycrystalline diamond blank tool insert 830 without an iron concentration gradient in the diamond body. Inventive polycrystalline diamond blank tool inserts 810, 820, as well as non-Fe gradient tools, were manufactured using the same grade diamond feed with crystalline diamond grains having an average grain size of 0.5 to 3 microns. The results in FIG. 10 for inventive polycrystalline diamond tools 810 and 820 was 24-26 microns; the results in FIG. 10 for comparative example polycrystalline diamond tool 830 was 95 microns.

Figure 11A:
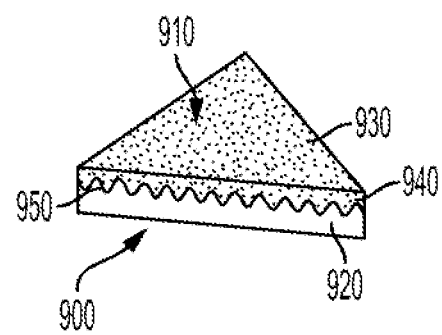
FIGS. 11A and 11B show additional examples of cutting tools that can be created from the disclosed blanks.
Figure 11B:
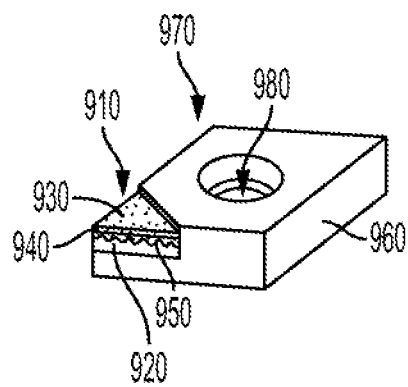

FIGS. 11A and 11B schematically show additional examples of cutting tools that can be created incorporating the disclosed blanks. The example cutting tools are illustrated in the form of a polycrystalline diamond blank 900 (also sometimes referred to as a tip) and a cutting tool 970 having at least portions formed from a polycrystalline diamond blank 900. For example, the illustrated polycrystalline diamond blank 900 includes a substrate 920 formed of a material such as tungsten carbide and a diamond body 910, which includes an outer working layer 930 and an intermediate layer 940 that is disposed therebetween. The diamond body 910, typically the intermediate layer 940, is bonded to the substrate 920. Preferably, the outer working layer 930 will have a thickness between 0.4 mm and 0.6 mm. In the illustrated example, the interface 950 of the polycrystalline diamond blank 900 between the diamond body 910 and the substrate 920 is non-planar, but other interface geometries and surfaces can be used, including planar. In the illustrated example, the interface 950 includes arches, which form the corrugated surface of the substrate 920 and which are preferably between 0.4 and 0.6 mm in height. To maintain a sufficient separation between the arches 960 and the outer working layer 930, the intermediate layer 940 should be at least 0.15 to 0.2 mm at its thinnest point (above the peaks of the corrugated surface), and will typically be between 0.5 and 0.6 mm at its thickest point. FIG. 11B schematically illustrates an example cutting tool 900, i.e., a tip, affixed to a substrate 960 to form a cutting tool insert 970. The tip can be affixed by, for example, brazing the tip to a seating surface of the substrate 960. An optional mounting feature, such as a hole 980 extending from a first side of the cutting tool to a second side of the cutting tool insert 970, can be configured to receive a fastener, such as a screw, for mounting the cutting tool insert 970, to a machining tool such as a milling tool (not shown). In FIGS. 11A and 11B, the polycrystalline diamond blank 900, i.e., a tip, is in the shape of a triangle, but other geometries can be used including circular, oval, and polygonal.

It should be noted that the properties, images and results, particularly in relation to FIGS. 4, 5A-5B, 6-7, and 10, are for a polycrystalline diamond blanks. However, similar results for the composition and compositional analysis of the diamond table would be expected to be obtained for a polycrystalline diamond compact. In each case, the iron-content is determined from the surface of the diamond body into an interior volume of the diamond body. For the case of the polycrystalline diamond blank, the surface is coincident with the interface between the diamond table and the substrate; for the case of the polycrystalline diamond compact, the surface is an exterior surface from which the HPHT sweep originated to consolidate the diamond table during HPHT processing. Additionally, the discussion and results related to the polycrystalline diamond blank is also translatable and applicable to polycrystalline diamond cutters.

In general, the diamond table of polycrystalline diamond compacts, polycrystalline diamond blanks, and polycrystalline diamond cutters disclosed herein can be formed by sintering diamond particles under high pressure, high temperature (HPHT) conditions in the presence of a metal catalyst (such as cobalt, Co). The metal catalyst can originate from an independent source, such as a metal catalyst powder blended into the diamond particles or in a layer adjacent the diamond particles or from a substrate material as described below. Typical HPHT conditions include pressures at or above about 4 GPa and temperatures at or above about 1400° C. Typically, under the HPHT processing conditions, binder material present in an independent source or in a substrate (typically a cemented carbide substrate) positioned adjacent to diamond powders melts and sweeps into the mass of diamond. When a substrate is present, the binder material of the substrate can act as a metal catalyst in the diamond powders. In the presence of the metal catalyst, diamond crystals bond to each other in diamond-to-diamond bonds by a dissolution-precipitation process to form a sintered compact in which a polycrystalline diamond mass, i.e., a diamond table, is formed which is attached to the substrate (if present). The presence of the metal catalyst facilitates formation of diamond-to-diamond bonds and, where applicable, the attachment of the diamond table to the substrate.

In particular embodiments, the diamond particles are contained within a diamond feed. The diamond feed includes 90 to 99 wt. % diamond particles and 1 to 10 wt. % of a cobalt-iron alloy. The cobalt-iron alloy is homogenously distributed in the diamond feed, for example by ball milling the diamond feed with both the diamond particles and the cobalt-iron alloy. In some embodiments, the diamond particles in the diamond feed have an average diameter of 3 microns or 30 microns. In other embodiments, the diamond particles in the diamond feed have other average diameters. For example, diamond particles can have an average diameter of 1 to 40 microns, alternatively 3 to 40 microns, alternatively, 25 to 30 microns, alternatively 1 to 25 microns, alternatively 3 to 25 microns, alternatively 1.5 to 3.0 microns. In alternative embodiments, the average diameter can be unimodal or multimodal.

In some embodiments, the cobalt-iron alloy is $Co_xFe_y$, where $0.6 \leq x \leq 0.8$, $0.2 \leq y \leq 0.4$, and $x+y=1.0$. Alternatively, the cobalt-iron alloy is $Co_xFe_y$, where $0.68 \leq x \leq 0.72$, $0.28 \leq y \leq 0.32$, and $x+y=1.0$. In still other alternative embodiments, the cobalt-iron alloy is $Co_xFe_y$, where $x=0.7$ and $y=0.3$.

The diamond feed is used to form an assembly, which will subsequently undergo HPHT processing at elevated temperature and elevated pressure sufficient to sinter the diamond feed into a diamond body. The assembly comprises a diamond catalyst source and a layer of diamond feed in contact with the diamond catalyst source contained in a refractory container. Forming the assembly continues by positioning a cap over the contents of the refractory container and sealing, such as by crimping.

When forming a polycrystalline diamond compact, the diamond catalyst source can be a metal catalyst powder blended into the diamond particles or a layer of metal catalyst powder adjacent the diamond particles. Example metal catalyst powders have a Co-based composition and are iron-free. A particular iron-free, Co-based composition suitable for use as a metal catalyst powder to form the disclosed polycrystalline diamond compact is cemented carbide or cobalt sintered tungsten carbide (WC—Co) with an addition of metallic cobalt to the feed of approximately 0.1-5 wt %.

When forming a polycrystalline diamond blank or a polycrystalline diamond cutter, the diamond catalyst source can be a substrate material positioned adjacent the diamond particles. Example substrate materials have a Co-based composition and are iron-free. A particular iron-free, Co-based composition suitable for use as a substrate to form the disclosed polycrystalline diamond blank or cutter is a substrate of cemented carbide or cobalt sintered tungsten carbide (WC—Co) with cobalt content ranging from 5-15 wt % in the substrate.

Metal catalyst remaining in the diamond table after the HPHT sintering process can be detrimental to polycrystalline diamond performance when used in cutting or machining applications or when drilling subterranean geologic formations. Therefore, metal catalyst remaining in the diamond table after the HPHT sintering process can optionally be removed in a subsequent leaching process. In the leaching process, at least a portion of the diamond body is exposed to an acid suitable for the dissolution of metal catalyst, such as aqua regia (a mixture of nitric acid and hydrochloric acid, optimally in a molar ratio of 1:3). Catalyst material in the portion of the diamond body exposed to the acid will be removed by the leaching process, leaving inter-grain regions in the acid-leached portion of the diamond body that are substantially free of catalyst material. As known in the art, at least partial catalyst material removal may provide a polycrystalline diamond material with increased thermal stability, which may also beneficially affect the wear resistance of the polycrystalline diamond material. When present, the acid-leached portion of the diamond body extends from a working surface into an interior volume of the diamond body.

Although the present invention has been described in connection with embodiments thereof, it will be appreciated by those skilled in the art that additions, deletions, modifications, and substitutions not specifically described may be made without departure from the spirit and scope of the invention as defined in the appended claims. For example, although described in relation to fissionable fuel materials, nuclear reactors, and associated components, the principles, compositions, structures, features, arrangements and processes described herein can also apply to other materials, other compositions, other structures, other features, other arrangements and other processes as well as to their manufacture and to other reactor types.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The illustrative embodiments described in the detailed description, drawings, and claims are not meant to be limiting. Other embodiments may be utilized, and other changes may be made, without departing from the spirit or scope of the subject matter presented here.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

What is claimed is:

1. A polycrystalline diamond compact, comprising: a volume of crystalline diamond grains bonded together by diamond-to-diamond bonds to form a diamond body, the diamond body including a plurality of inter-grain regions disposed between the bonded crystalline diamond grains; a cobalt-based catalyst material present in at least a portion of the plurality of inter-grain regions; and an iron concentration gradient extending from an exterior surface of the diamond body into an interior volume of the diamond body, wherein the iron concentration gradient varies from between about 0 wt. % to 0.01 wt % Fe at the exterior surface of the diamond body to 0.7 to 0.9 wt. % at a distance of 600 to 700 microns from the exterior surface of the diamond body.

2. The polycrystalline diamond compact according to claim 1, wherein the iron concentration gradient varies linearly from the exterior surface of the diamond body into the interior volume of the diamond body.

3. The unsupported polycrystalline diamond compact according to claim 1, wherein the crystalline diamond grains have an average grain size of 0.5 to 3 microns.

4. A polycrystalline diamond compact, comprising: a volume of crystalline diamond grains bonded together by diamond-to-diamond bonds to form a diamond body, the diamond body including a plurality of inter-grain regions disposed between the bonded crystalline diamond grains; a cobalt-based catalyst material present in at least a portion of the plurality of inter-grain regions; and an iron concentration gradient extending from an exterior surface of the diamond body into an interior volume of the diamond body, wherein the iron concentration gradient varies from between 0.01 to 0.1 wt. % Fe at the exterior surface of the diamond body to 0.7 to 0.9 wt. % at a distance of 600 to 700 microns from the exterior surface of the diamond body.

5. A polycrystalline diamond compact, comprising: a volume of crystalline diamond grains bonded together by diamond-to-diamond bonds to form a diamond body, the diamond body including a plurality of inter-grain regions disposed between the bonded crystalline diamond grains; a cobalt-based catalyst material present in at least a portion of the plurality of inter-grain regions; and an iron concentration gradient extending from an exterior surface of the diamond body into an interior volume of the diamond body, wherein the iron concentration gradient varies from between about 0 wt. % to 0.01 wt % Fe at the exterior surface of the diamond body to about 0.3 to 0.4 wt. % at a distance of 600 to 700 microns from the exterior surface of the diamond body.

6. The polycrystalline diamond compact according to claim 5, wherein the crystalline diamond grains have an average grain size of 25 to 30 microns.

7. A polycrystalline diamond compact, comprising: a volume of crystalline diamond grains bonded together by diamond-to-diamond bonds to form a diamond body, the diamond body including a plurality of inter-grain regions disposed between the bonded crystalline diamond grains; a cobalt-based catalyst material present in at least a portion of the plurality of inter-grain regions; and an iron concentration gradient extending from an exterior surface of the diamond body into an interior volume of the diamond body, wherein the iron concentration gradient varies from between 0.01 to 0.1 wt. % Fe at the exterior surface of the diamond body to 0.3 to 0.4 wt. % at a distance of 600 to 700 microns from the exterior surface of the diamond body.

8. A polycrystalline diamond blank comprising the polycrystalline diamond compact according to claim 1 and a hard metal substrate, wherein the diamond body is bonded to the hard metal substrate to form an interface.

9. The polycrystalline diamond blank according to claim 8, wherein the hard metal substrate has a composition including cemented carbide or cobalt sintered tungsten carbide (WC—Co).

10. The polycrystalline diamond blank according to claim 8, wherein the hard metal substrate has a composition that is iron-free.

11. A metal cutting tool, comprising:
a metal alloy body including a front end, a shaft portion, and a rear end adapted to be mounted in a tool holder, wherein the front end, the shaft portion, and the rear end are arranged sequentially along a longitudinal axis of the body; and
a polycrystalline diamond compact according to claim 1 attached to the front end.

* * * * *